Figures 1, 2:
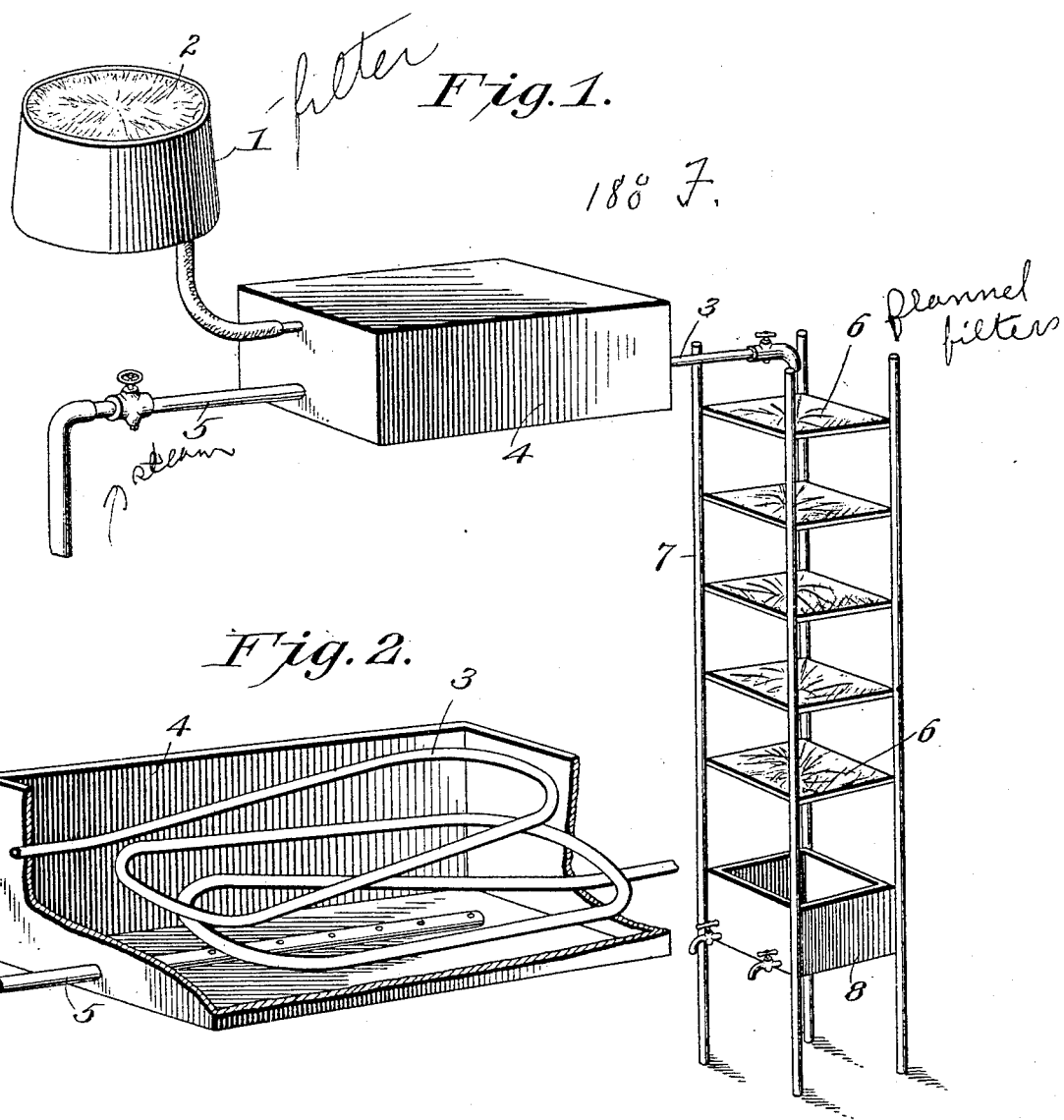

No. 862,960. PATENTED AUG. 13, 1907.
L. BEYEA.
PROCESS OF TREATING CIDER.
APPLICATION FILED NOV. 21, 1905.

Witnesses
Inventor
Lewis Beyea

UNITED STATES PATENT OFFICE.

LEWIS BEYEA, OF BALDWIN PLACE, NEW YORK.

PROCESS OF TREATING CIDER.

No. 862,960.  Specification of Letters Patent.  Patented Aug. 13, 1907.

Application filed November 21, 1905. Serial No. 288,488.

*To all whom it may concern:*

Be it known that I, LEWIS BEYEA, a citizen of the United States, residing at Baldwin Place, in the county of Westchester and State of New York, have invented certain new and useful Improvements in Processes of Treating Cider; and I do hereby declare the following to be a full, clear, and exact description of the invention, such as will enable others skilled in the art to which it appertains to make and use the same.

My invention relates to a process for treating cider so as to preserve the same in an unfermented condition and its object is to provide a process which can be quickly completed, which does not use acids or chemicals of any kind, for preserving the cider or for other purposes.

In the drawings—Figure 1 is a perspective view of a filter used in the process of treating the cider, and, Fig. 2 is a perspective view, partly in section, of the heating tank employed.

In carrying out my process the pure apple juice is taken directly from the press and placed in a suitable tank 1, said tank having a covering 2 of cloth or the like so as to remove all solid matter from the juice. The juice is then conveyed through a copper pipe 3, disposed in a tank 4, said pipe being submerged in water which is heated in any preferred manner, as by forcing steam into the tank 4 through a pipe 5 and in this manner the temperature of the juice in the copper pipe is raised to about 180 degrees F. The juice is then discharged from the copper pipe through a series of flannel filters 6, disposed one below the other, and separated at a distance, said filters being held in position by uprights 7. At the lower end of the uprights 7 and below the filters 6 is a basin 8, adapted to catch the juice after it has passed through the plurality of filters. By passing the juice through the filters 6, said juice is cooled as it descends by bringing it into contact with the air. The juice is removed from the basin 8 and placed in bottles or the like and is then heated in any preferred way to about 180 degrees F. When the cider has reached the desired temperature the bottles or the like are sealed and the process is thus completed. Cider treated in this manner will last indefinitely without fermentation and constitutes a healthful drink containing no chemicals or acids to assist its preservation.

Having thus fully described my invention, what I claim as new and desire to secure by Letters Patent, is—

The herein described process of treating cider which consists in first filtering the fresh juice directly after its extraction, then removing solid matter, then passing the juice through a circuitous inclosure, heating the same while in motion, to the temperature of 180° Fahrenheit under exclusion of air, then passing the juice directly upon its discharge from said circuitous route, through a succession of filtering steps in contact with air and allowing the same to fall through the open air, then packaging, then sterilizing and finally sealing.

In testimony whereof I have signed my name to this specification in the presence of two subscribing witnesses.

LEWIS BEYEA.

Witnesses:
 H. R. MILLER, Jr.,
 H. M. SUPPLE.